United States Patent
Lavian et al.

(10) Patent No.: US 8,787,536 B1
(45) Date of Patent: *Jul. 22, 2014

(54) SYSTEMS AND METHODS FOR COMMUNICATING WITH AN INTERACTIVE VOICE RESPONSE SYSTEM

(71) Applicants: Tal Lavian, Sunnyvale, CA (US); Zvi Or-Bach, San Jose, CA (US)

(72) Inventors: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,641

(22) Filed: Aug. 5, 2013

Related U.S. Application Data

(63) Continuation of application No. 13/046,532, filed on Mar. 11, 2011, now Pat. No. 8,548,131.

(51) Int. Cl.
*H04M 11/00* (2006.01)
*H04M 3/53* (2006.01)

(52) U.S. Cl.
CPC .................................. *H04M 3/5315* (2013.01)
USPC ..................................... 379/88.13; 379/88.18

(58) Field of Classification Search
USPC ............................................ 379/88.13, 88.18
See application file for complete search history.

(56) References Cited

U.S. PATENT DOCUMENTS

| | | | |
|---|---|---|---|
| 6,292,480 B1 * | 9/2001 | May .............................. | 370/352 |
| 6,920,425 B1 * | 7/2005 | Will et al. ..................... | 704/275 |
| 7,054,939 B2 * | 5/2006 | Koch et al. ................... | 709/227 |
| 7,065,188 B1 * | 6/2006 | Mei et al. .................. | 379/88.23 |
| 7,551,782 B2 * | 6/2009 | Haim Lev ..................... | 382/209 |
| 7,702,083 B2 * | 4/2010 | Erhart et al. ............... | 379/88.22 |
| 7,813,485 B2 * | 10/2010 | Yin et al. ................... | 379/88.13 |
| 8,539,354 B2 * | 9/2013 | Beswick et al. .............. | 715/719 |

* cited by examiner

*Primary Examiner* — Simon Sing

(57) ABSTRACT

Embodiments of the present invention provide a communication device. The communication device comprises a processor. Further, the communication device comprises a memory coupled to the processor. The memory comprises a database comprising at least one visual Interactive Voice Response (IVR) menu associated with at least one IVR system. Further, the memory comprises instructions executable by the processor for sending a first section of a data packet to a second communication device. The first section comprising first information is sent based on a visual IVR menu associated with the second communication device. Further, the memory comprises instructions executable by the processor for receiving an acknowledgement message from the second communication device based on the first section of the data packet. Furthermore, the memory includes instructions executable by the processor for sending a second section of the data packet to the second communication device based on the acknowledgement message. The second section comprises second information.

20 Claims, 11 Drawing Sheets

SYSTEMS AND METHODS FOR COMMUNICATING WITH AN INTERACTIVE VOICE RESPONSE SYSTEM

CROSS REFERENCE TO RELATED APPLICATIONS

This application is a Continuation application (CA) of U.S. Non-Provisional application Ser. No. 13/046,532 entitled 'Systems and methods fir communicating with an interactive voice response system' and filed on Mar. 11, 2011.

FIELD OF THE INVENTION

The invention relates to Interactive Voice Response (IVR) system and more specifically the invention relates to establishing, a communication session among plurality of communication devices comprising an IVR application.

BACKGROUND OF THE INVENTION

Interactive Voice Response (IVR) technology is generally used to detect voice and key inputs from a caller. Various organizations such as banks, insurance companies, and other service providers use IVR technology to manage calls from their customers. Typically, IVR systems are used by organizations that have high call volumes. An objective for implementing the IVR systems is to provide the customers with a quick and good experience. Moreover, the cost of providing the services is reduced.

Generally, when the caller calls a destination, such as a bank, an automated audio menu is played. The audio IVR menu can contain instructions to provide instant services such as account balance inquiry when the destination is a bank. Further, audio menu can provide options for the caller to connect to a desired can inside the destination. For example, the menu may direct the caller to press various keys on a telephone to connect to a particular department or agent. The audio IVR menu is designed specific to a destination. Therefore, each destination or organization may have different IVR menus. Further, the IVR menu in an organization can be based on the type of departments, type of services, customer care executives or agents and so forth. For example, an IVR menu of a bank may include options related to the account details of the caller, while an IVR menu of a pizzeria may contain options to order or select a pizza.

Typically, the caller calling the destination may have to listen and follow instructions on the menu to get a desired response or a function performed. Therefore, the process can be time consuming. Moreover, in case the caller provides an incorrect input, the complete process may have to be repeated. Furthermore, the IVR menu for an organization may be updated or changed regularly. For example, extension numbers inside an organization may be changed and correspondingly, the extension numbers associated with the IVR menu may be updated. As a result, a frequent caller may not be able to reach a desired end by remembering a combination of numbers. Therefore, the caller may become frustrated with the IVR systems.

Some prior art try to address this problem by providing visual form of IVR. These prior arts display the IVR menu graphically on a caller device. U.S. Pat. No. 7,215,743 assigned to International Business Machines Corporation and a published U.S. patent application with Ser. No. 11/957,605, filed Dec. 17, 2007 and assigned to Motorola Inc, provides the IVR menu of the destination in a visual form to the caller. The caller can select the options from the IVR menu without listening to the complete audio IVR menu. However, the IVR menu displayed on the caller device is stored on an IVR server at the destination end. As a result, the visual IVR menu is specific to the destination and only the IVR of the destination dialled is displayed. These techniques therefore, require each destination to set-up hardware, software and other facilities to be deployed for providing visual IVR servers.

Another existing technique as disclosed in U.S. Pat. No. 6,560,320 assigned to International Business Machines Corporation enables an operator of the IVR to send customized signals to the caller for generating and displaying graphical elements on the device of the caller. Thereafter, the caller can respond by selecting options through touch-screen interface of the device. Dual Tone Multi frequency (DTMF) signals of the IVR. However, this technique requires a specifically configured device to interpret the codes sent as Dual Tone Multi frequency (DTMF) signals for generating the graphics. Moreover, an operator is required to present the graphics to the caller. Furthermore, specialized software and hardware are required at the operator to design and generate DIME codes. Therefore, the technique faces various practical limitations.

Generally, the IVR menus of the organizations are in form of audible menu. Moreover, there are a large number of organizations that use IVR menus. Therefore, converting the audible menus to visual menus can be time consuming. An existing technique, as disclosed in U.S. Pat. No. 6,920,425 assigned to Nortel Networks Limited, discloses an automated script to convert the audible menus scripts to visual menu scripts. However, the audible menus scripts must be available in a particular format to enable the conversion. Furthermore, the audio menu scripts must be available or downloadable for the program to function. As a result, only the audio menus scripts that are available can be converted to visual menu scripts. Furthermore, the device of the caller must be designed or programmed to understand the visual menu scripts.

The effectiveness of providing the IVR in visual form is discussed in a technical paper titled, 'The Benefits of Augmenting Telephone Voice Menu Navigation with Visual Browsing and Search' by Min Yin et al. The paper discusses a setup where visual content of the IVR is sent from a service provider to a computer connected to a mobile phone. However, the technique discussed in the paper is limited to the visual content provided by the service provider's end, after the connection is established. Moreover, the providers are required to individually set up the hardware and services for providing visual content.

As discussed above the existing technologies have various limitations. Therefore, system and method are desired for communicating among IVR enabled communication devices.

SUMMARY

Embodiments of the present invention provide a communication device. The communication device comprises a processor. Further, the communication device comprises it memory coupled to the processor. The memory comprises a database comprising at least one visual Interactive Voice Response (IVR) menu associated with at least one IVR system. Further, the memory comprises instructions executable by the processor for sending a first section of a data packet to a second communication device. The first section comprising first information is sent based on a visual IVR menu associated with the second communication device. Further, the memory comprises instructions executable by the processor for receiving an acknowledgement message from the second communication device based on the first section of the data packet. Furthermore, the memory includes instructions executable by the processor for sending a second section of the data packet to the second communication device based on the acknowledgement message. The second section comprises second information.

An aspect of the invention is to provide a communication device for communicating with a second communication device. The communication device includes an IVR application such as Visuphone. In an embodiment, the second communication device also includes the IVR application such as Visuphone.

Embodiments of the present invention provide a method for communicating among a plurality of communication devices. The method comprises sending, by a communication device, a first section of a data packet to a second communication device. The first section comprising first information is sent based on a visual Interactive Voice Response (IVR) menu associated with at least one IVR system. Further, the method comprises receiving, at the communication device, an acknowledgement message from the second communication device based on the first section of the data packet. Furthermore, the method comprises sending, by the communication device, a second section of the data packet to the second communication device based on the acknowledgement message. The second section comprises second information.

Embodiments of the invention provide a method for establishing a communication session in a communication network. The method comprises dialling, by a communication device, a phone number of a second communication device. The second communication device comprises an Interactive Voice Response (IVR) system. Further, the method comprises detecting, by the communication device, a data network. Furthermore, the method comprises sending by the communication device, a first section of a data packet to the dialled second communication device when the data network is detected. The first section comprises first information.

An aspect of the invention is to provide a method for establishing a communication session in a communication network. The communication session may be established between two or more IVR enabled devices.

Another aspect of the invention is to provide a method for establishing a communication session among a plurality of communication devices. The communication devices may or may not include Visuphone.

Yet another aspect of the invention is to provide a method for establishing a communication session among a plurality of communication devices. The communication session is established by sending one or more packets when a data network such as the Internet is available.

BRIEF DESCRIPTION OF THE DRAWINGS

Figure 1A:
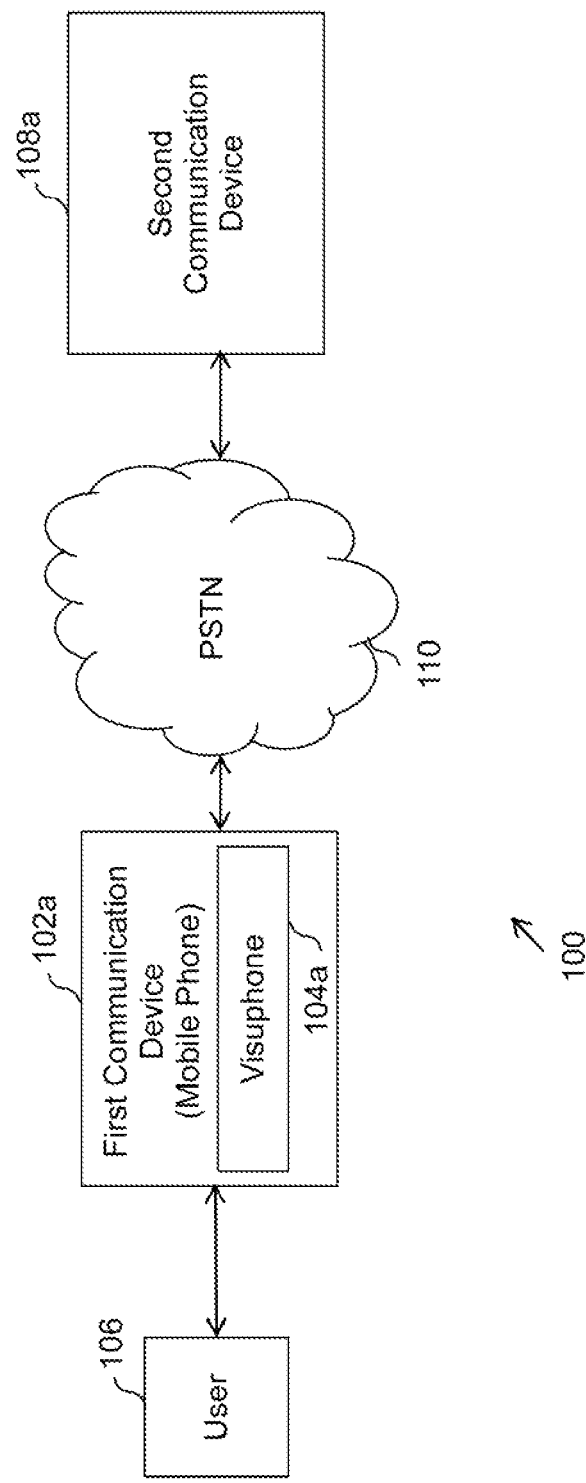
Figure 1B:
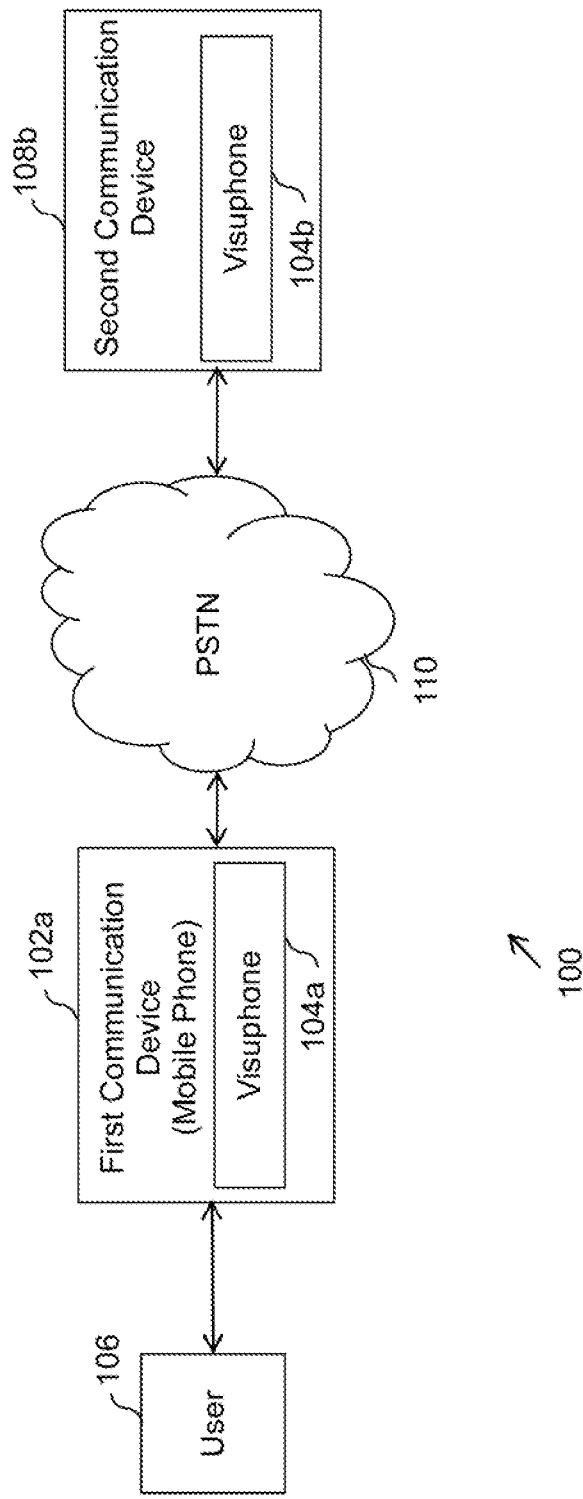
Figure 1C:
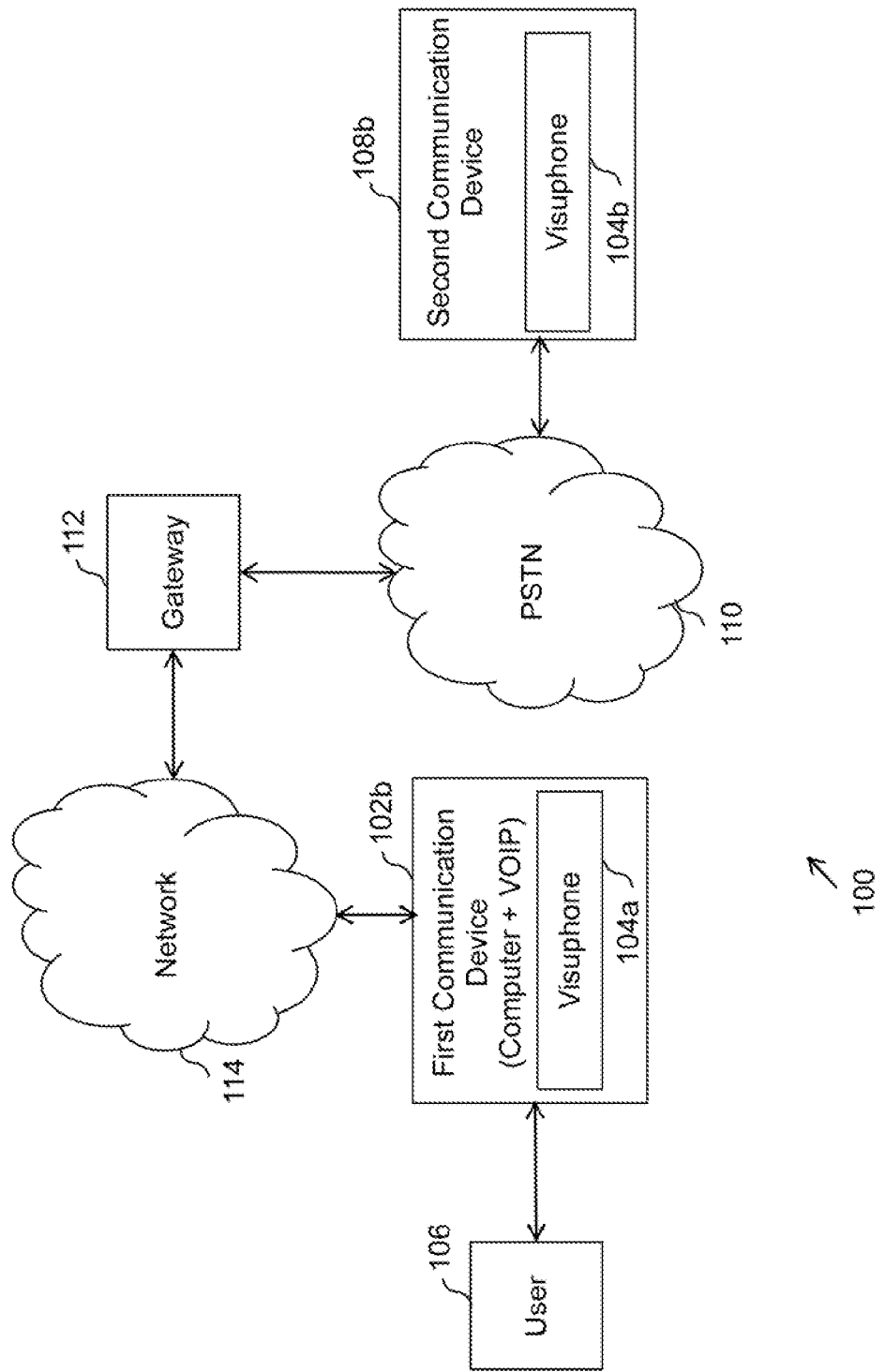
Figure 1D:
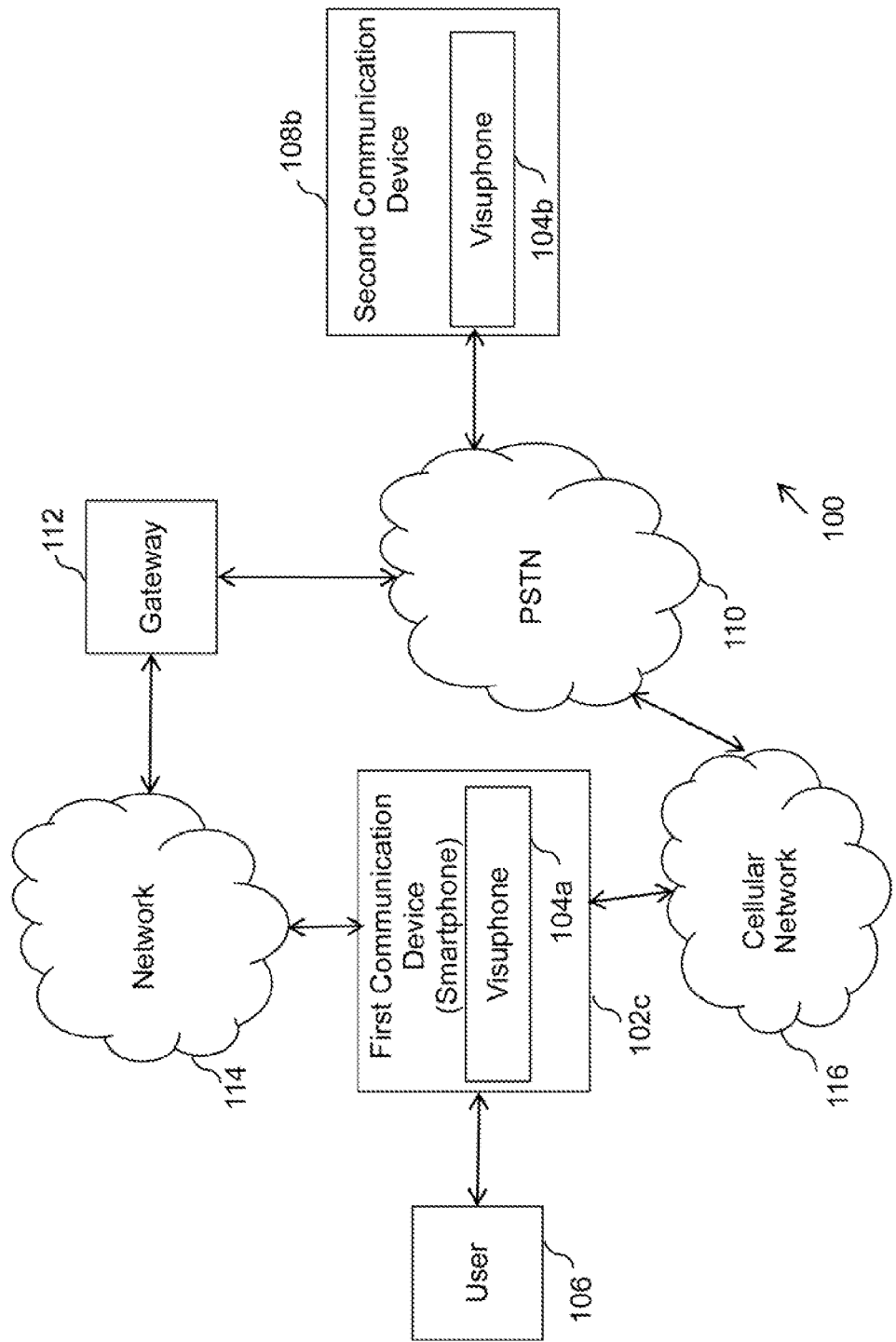
Figure 2A:
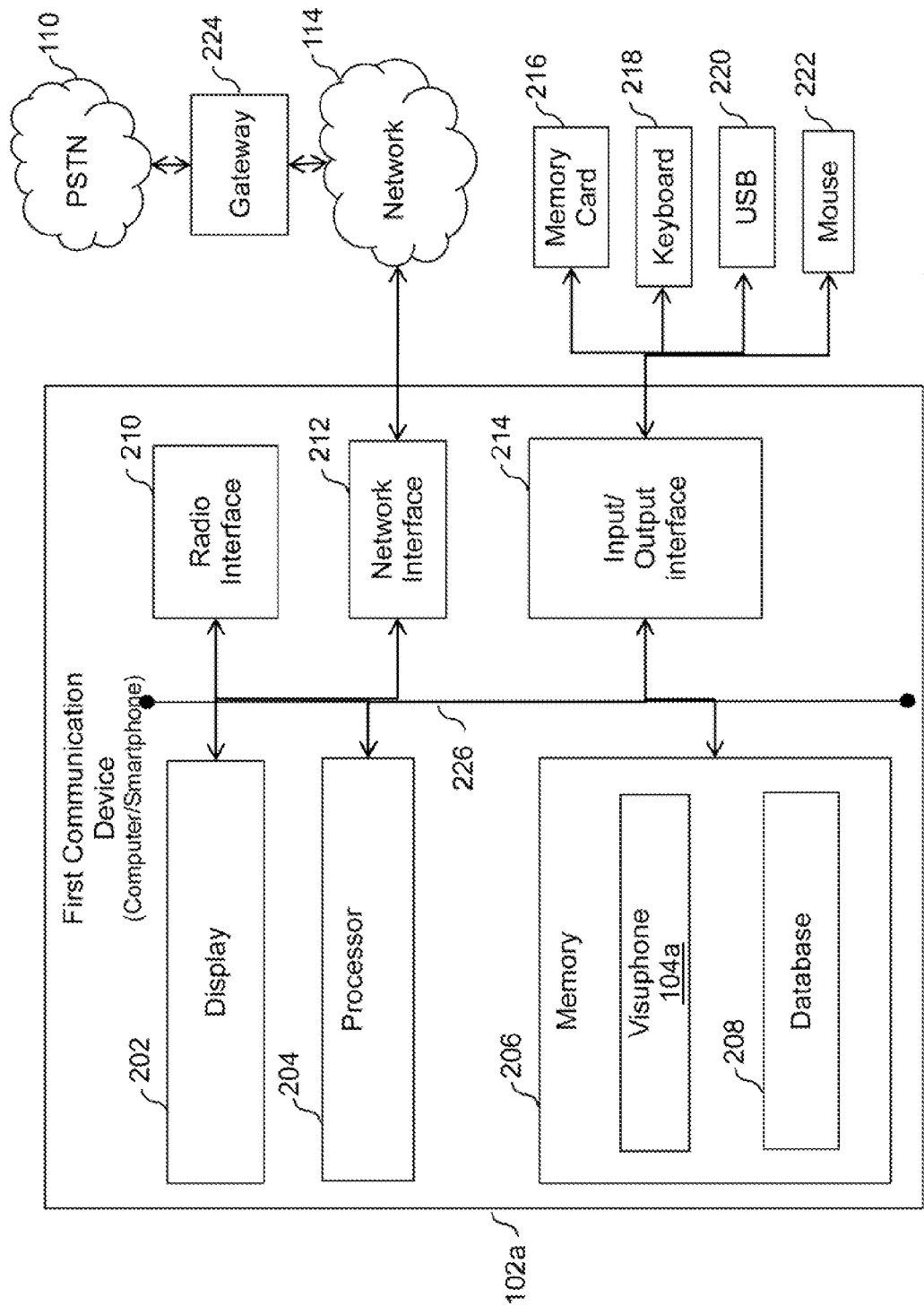
Figure 2B:
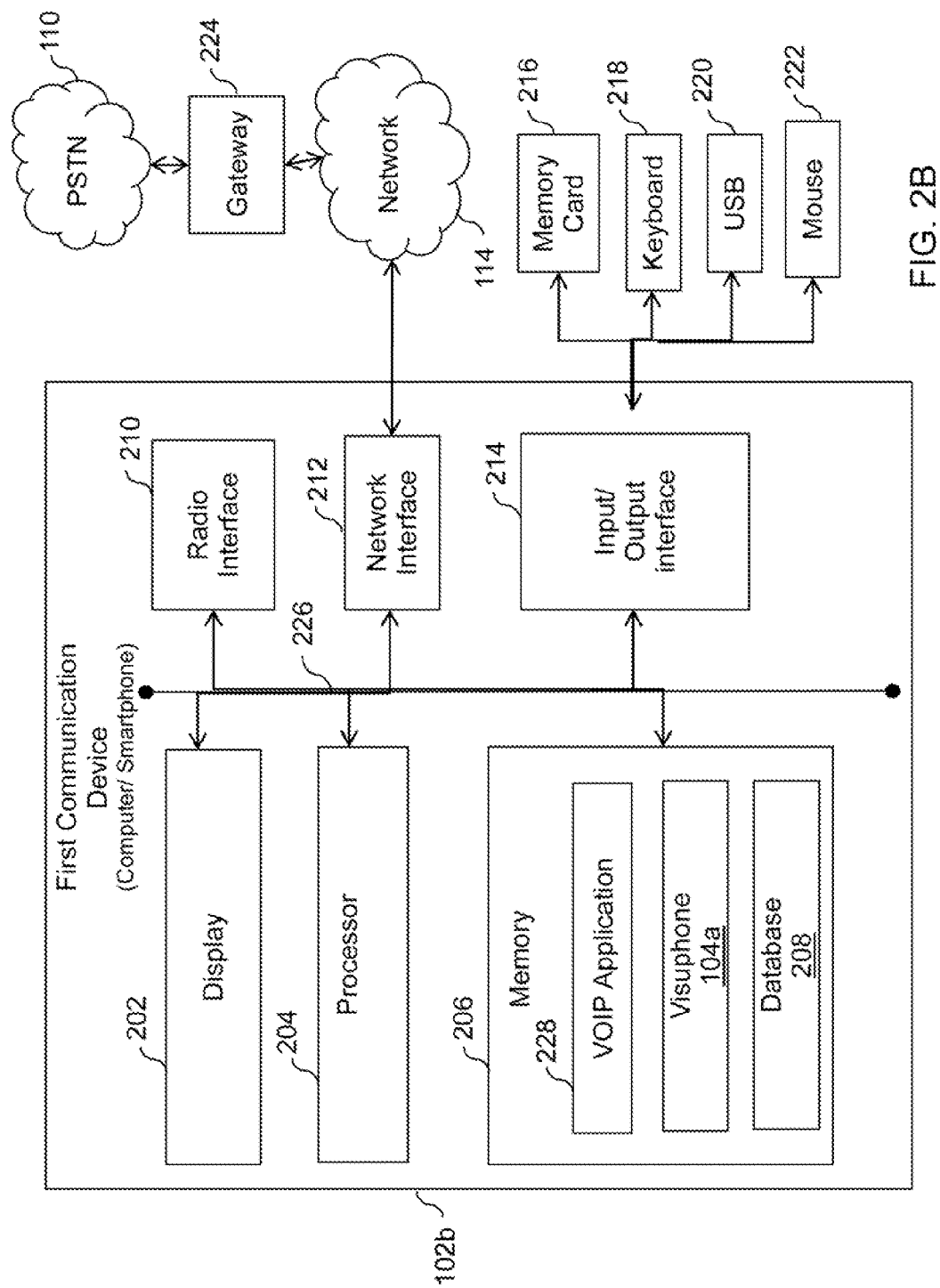
Figure 3:
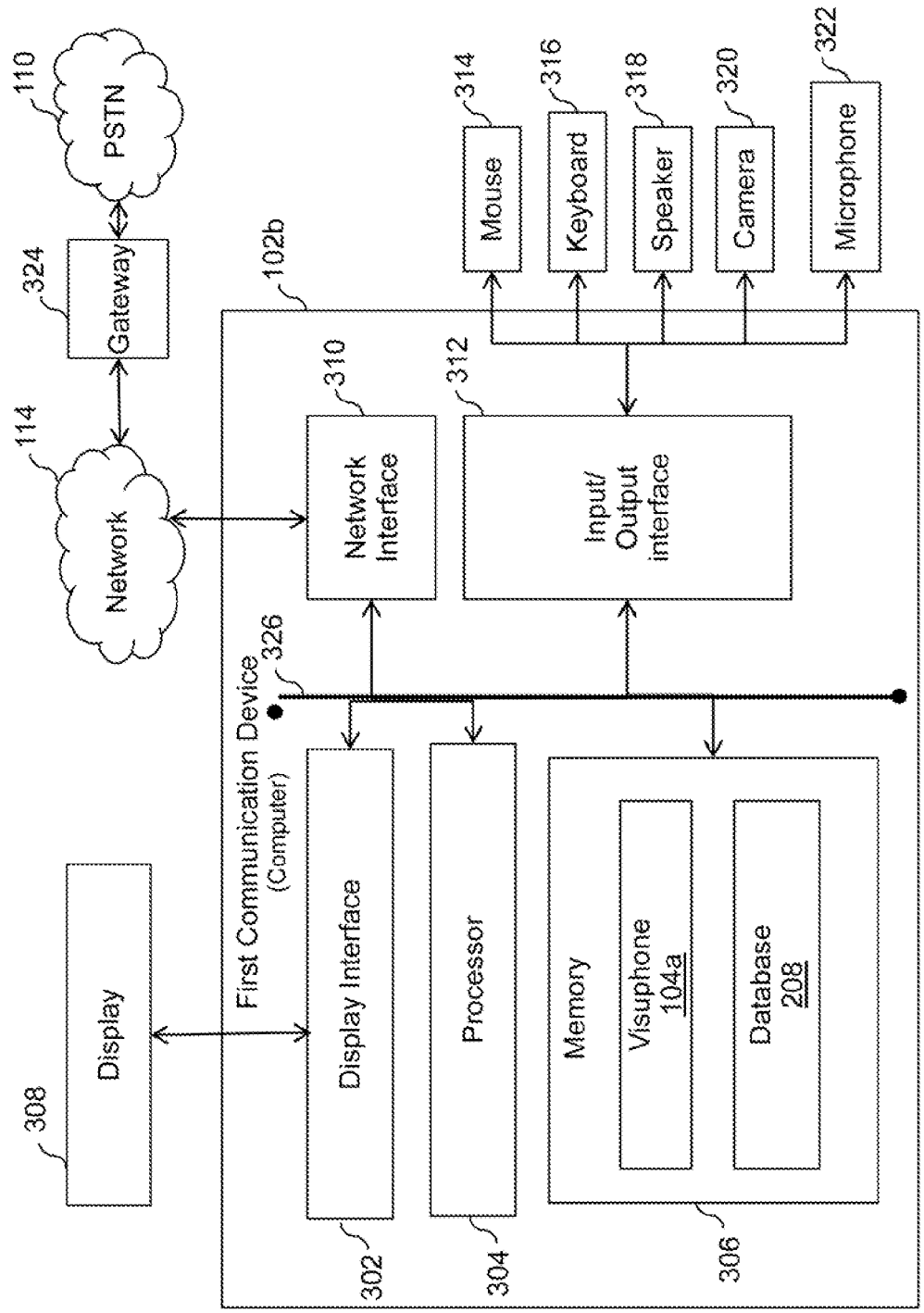
Figure 4A:
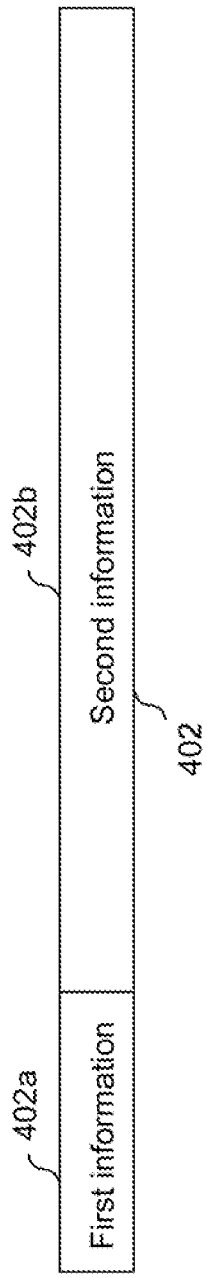
Figure 4B:
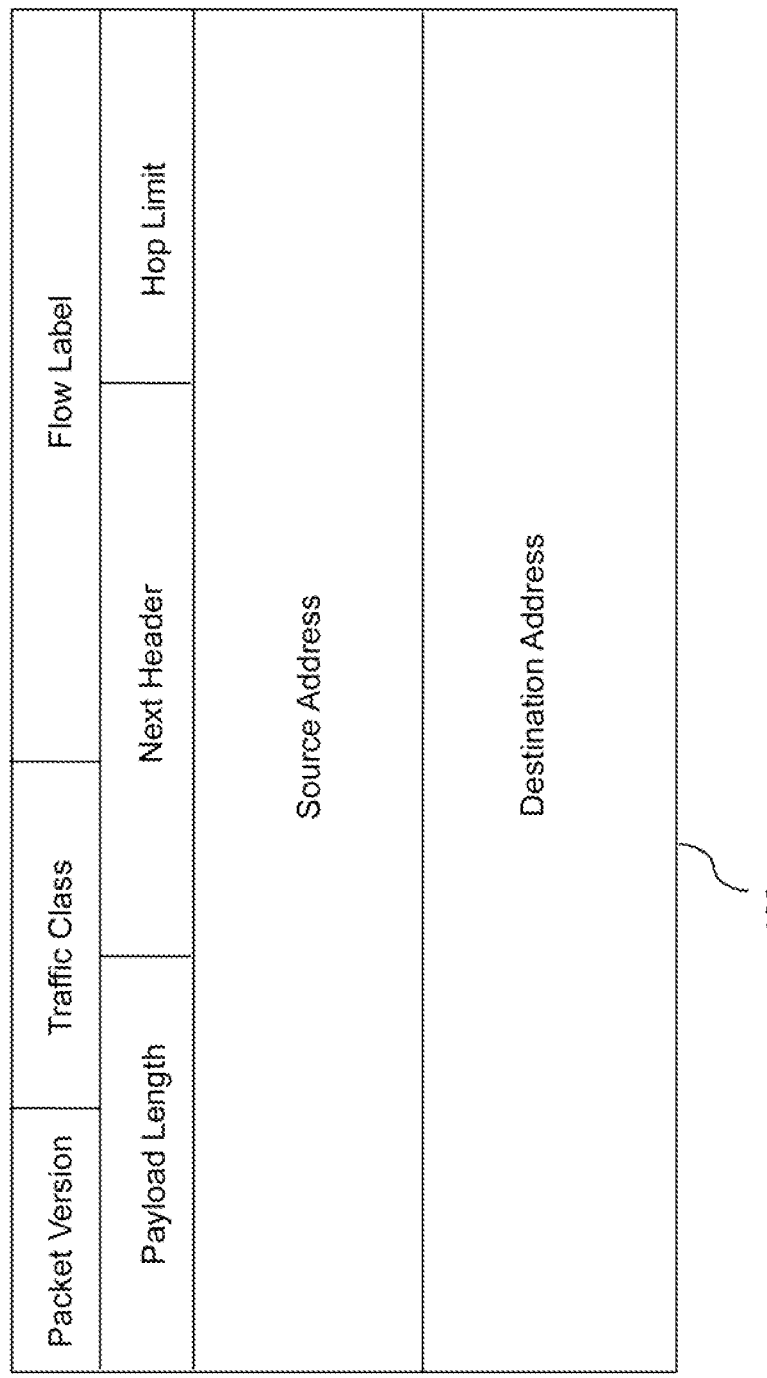
Figure 5A:
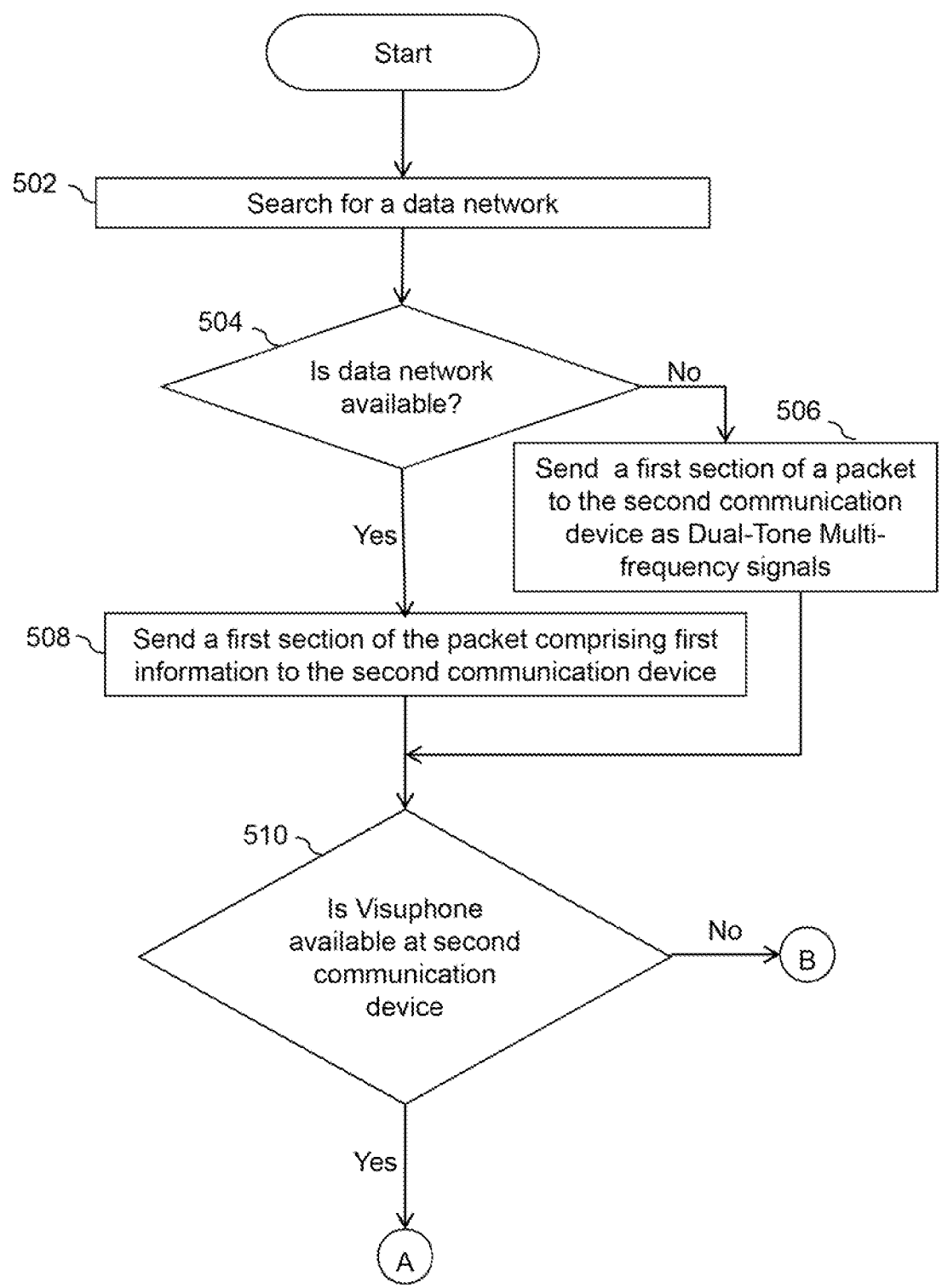
Figure 5B:
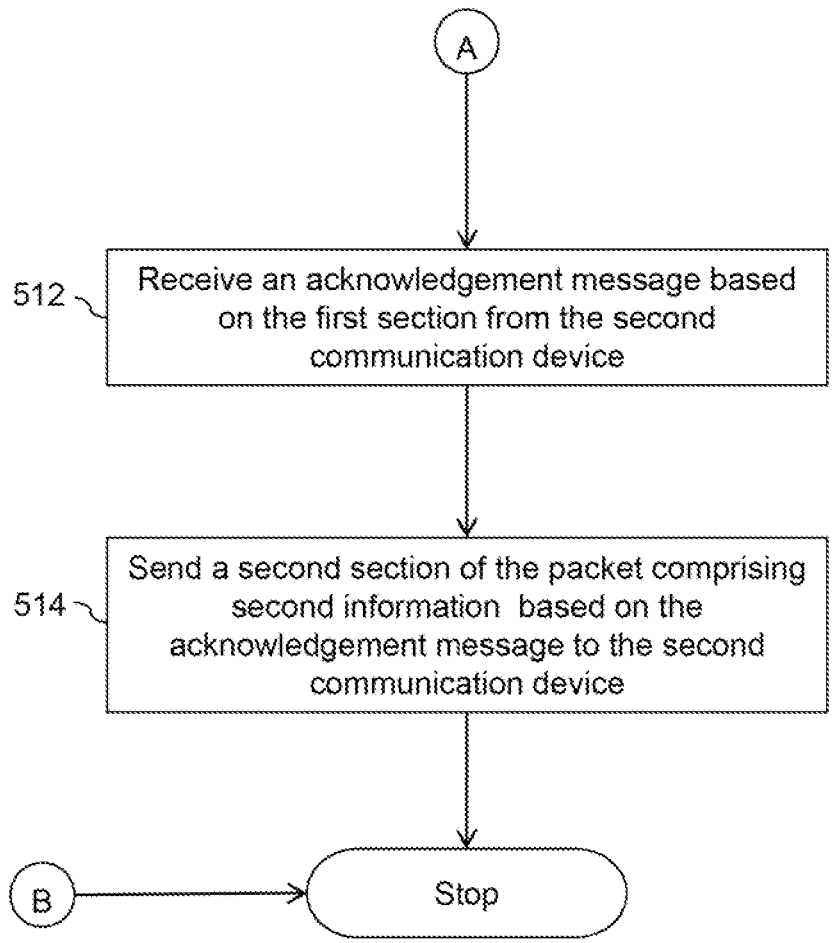

Having thus described the invention in general terms, reference will now be made to the accompanying drawings, which are not necessarily drawn to scale, and wherein:

FIG. 1A illustrates art exemplary environment where various embodiments of the invention function;

FIG. 1B illustrates another exemplary environment where various embodiments of the invention function;

FIG. 1C illustrates another exemplary environment where various embodiments of the invention function;

FIG. 1D illustrates yet another exemplary environment where various embodiments of the invention function;

FIGS. 2A and 2B illustrates exemplary components of the communication device thr implementing a Visuphone, in accordance with an embodiment of the invention;

FIG. 3 illustrates exemplary components of the communication device for implementing the Visuphone, in accordance with another embodiment of the invention;

FIG. 4A illustrates an exemplary packet sent from a communication device to a second communication device, in accordance with an embodiment of the invention;

FIG. 4B illustrates an exemplary structure of a first section of the packet, in accordance with an embodiment of the invention; and FIGS. 5A and 5B illustrates a flowchart diagram for communicating among a plurality of communication devices, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed, as limited to the embodiments set forth herein; rather, these embodiments are provided, so that this disclosure will satisfy applicable legal requirements. Like numbers refer to like elements throughout.

FIG. 1A illustrates an exemplary environment where various embodiments of the invention function. A communication network 100 includes a communication device 102a. In an embodiment, the communication network 100 may include different types of communication devices 102a-n. In an embodiment, the communication device 102a may be referred as a first communication device. Further, the communication network 100 includes a second communication device 108a. A person skilled in art will appreciate, that the communication network 100 may also include a plurality of communication devices 102. In an embodiment, the communication network 100 may include a plurality of second communication devices 108. Examples of the communication network 100 include, but are not limited to, the Internet, PSTN, Local Area Network (LAN), Wide Area Network (WAN), Metropolitan Area Network (MAN), and so forth. In an embodiment, the communication network 100 can be a data network such as the Internet. The data network is a network capable of establishing data and voice communication among various communication devices. In an embodiment, the communication network 100 can be a telecommunication or telephone network capable of establishing only voice communication among various communication devices.

A user 106 may use the communication device 102a to connect to the second communication device 108a (hereafter the second communication device 108a may be referred as second communication device 108 or interchangeably). The communication device 102a can be a telecommunication device that can connect directly to a Public Switched Telephone Network (PSTN) 110. A person skilled in the art will appreciate, that the communication device 102a can also connect to a private telephone exchange. Examples of the communication device 102a include, but are not limited to a telephone, a mobile phone, a smart phone or any other device capable of voice or data communication. The user 106 may dial a phone number associated with the second communication device 108a for initiating a call for connecting to the second communication device 108a. The communication device 102a may have one or more associated phone numbers, which may be used by other devices for connecting to the communication device 102a. Similarly, each of the plurality of the second communication device 108 may have associated at least one phone number. In another embodiment, the communication device 102a may include a plurality of visual Interactive Voice Response (IVR) menus corresponding to phone numbers of the plurality of second communication devices 108. In an embodiment, the communication device 102a may include an IVR application.

In an embodiment, the communication device 102a may include the IVR application such as Visuphone 104a. The Visuphone 104a may be hardware, an application stored as software, a firmware on the communication device 102a, or a combination thereof. The Visuphone 104a may provide data regarding a phone number of the second communication device 108a dialled by a user 106 of the communication device 102a. For example, the data may include geographical information or services provided by the second communication device 102a-n. The second communication device includes an IVR system. The IVR system allows a caller or the user 106 to interact automatically with the second communication device 108a. When the user 106 dials a phone number and connects to the second communication device 108a, an audible IVR menu may be played to the user 106. The second communication device 108a can have more than one IVR menus. The Visuphone 104a may display a visual IVR menu on the communication device 102a corresponding to the audible IVR menu associated with the phone number of the second communication device 108a to be connected.

The second communication device 108a can be a device capable of data/voice communication. Examples of the second communication device 108a include, but are not limited to, a telephone, a computer, a laptop computer, a personal digital assistant (PDA), a mobile phone, and so forth. Various types of the second communication device 108a that implement the audible IVR menu include, thr example, banks, hotels, fast-food outlets, utility services providers, corporate offices, mobile phone service providers, hospitals and so forth. In an embodiment, the second communication device 108a can have more than one audio/visual IVR menus. Typically, the audible IVR menu provided by the second communication device 108a comprises audible options or instructions. In an embodiment, the visual IVR menu includes one or more text and/or graphical representation of different nodes corresponding to afferent nodes of the audio IVR menu. The user 106 may be required to select various options from the audible IVR menu to obtain the required information or service from the dialled second communication device.

In an embodiment, the Visuphone 104a may send or receive, one or more messages to or from the second communication device 108a for establishing a communication session with the second communication device 108a. The one or messages may be sent as data packets when a data network such as the Internet is available. In an embodiment; the one or more messages may be sent as Dual-Tone Multi-Frequency (DTMF) signals or tones. After establishing a communication session with the second communication device 108a, the user 106 can interact with the second communication device 108a via the visual IVR menu associated with the second communication device 108a. In an embodiment, the communication device 102a may receive an acknowledgement message from the second communication device 108a.

In an embodiment, the communication network 100 may include a server. The server may maintain the updated information of the second communication device 108a. In an embodiment of the invention, the communication device 102a can request and/or receive updates from the server.

FIG. 1B illustrates another exemplary environment where various embodiments of the invention function. As discussed with reference to FIG. 1A, the communication network includes the communication device 102a and the second communication device 108a. As shown the communication network 100 may further include, a second communication device 108b (hereafter the second communication device 108b may be referred as second communication device 108 or interchangeably). The communication device 102a can be a telecommunication device that can connect directly to a PSTN 110. The communication device 102a includes a Visuphone 104a capable of displaying data related to the second communication device 108a. Further, the Visuphone 104a may send or receive one or more messages to or from the second communication device 108a. In an embodiment, the one or more messages exchanged may be in the form of data packets. In an embodiment, the data packet may be an Internet Protocol version 6 (IPv6) packet. In another embodiment, the one or more messages exchanged may be in the form of DTMF signals or tones.

In an embodiment of the invention, the second communication device 108b may also include a Visuphone 104b. The Visuphone 104b may send or receive one or more messages including information such as acknowledgment to or from the communication device 102a. The Visuphone 104b is capable of sending messages required to establish a communication session with the communication device 102a.

FIG. 1C illustrates another exemplary environment where various embodiments of the invention function. As shown, a communication device 102b can be a communication device that may be connected directly to a network 114. Examples of the communication device 102b include, but are not limited to, a personal computer, a laptop, a mobile phone, a smartphone, a fixed line telephone, a Voice Over Internet Protocol (VOIP) phone or other devices capable of voice or data communication. The communication device 102b may include various applications or computer programs that enable the user 106 to use the communication device 102b for dialling a phone number of the second communication device 102a-n through PSTN 110 over network 114 through a gateway 112. For example, the applications may be VOW applications, such as but not limited to Skype, Magic Jack, Google Talk and so forth. Examples of the network 114 include any wired or wireless network, such as but not limited to, LAN, WAN, a Wi-Fi network and so forth. As discussed with reference to FIG. 1A and FIG. 1B, the second communication device 108b (or 108a) presents the audible IVR to the communication device 102b. As discussed with reference to FIG. 1A, the Visuphone 104a may initiate a call to a phone number of the second communication device 108b. The Visuphone 104a may further display the visual IVR menu associated with the dialled phone number of the second communication device 108b. Further, the Visuphone 104a may search or detect a data network. In an embodiment, the Visuphone 104a may send one or more messages in the form of data packets when a data network such as the Internet is available to the second communication device 108b. Further, the Visuphone 104a may establish a communication session with the second communication device 108b by exchanging one or more messages or data packets. Furthermore, the Visuphone 104a may send a first section of a data packet including first information to the second communication device 108. In an embodiment, the Visuphone 104a may receive a message including acknowledgement information from the second communication device 108. The communication device 102a receives the acknowledgement message when the second communication device 108 (108b) includes an IVR application such as the Visuphone 104b as shown in FIG. 113. The acknowledgement message may be received based on the first section of the data packet. Thereafter, the Visuphone 104a of the communication device 102a may send a second section of the data packet including second information such as a payload. In an embodiment, the first Visuphone 104 may exchange one or messages with the Visuphone 104b or the second communication device 108a in form of Dual-Tone Multi-Frequency (DTMF) signals or tones.

FIG. 1D illustrates yet another exemplary environment where various embodiments of the invention function. As shown, the communication device 102c can be connected to the PSTN 110 through the network 114 or through a cellular network 116. Various service providers provide multiple or overlapping services to customers. For example, cable television service provider may also provide phone and network service, optical network provider may also provide phone or television services, WiMax service providers that provide phone service, and so forth. The network 114 may be any service provider that provides such services, for example, but not limited to, cell phone services, wireless services, network services, cable television services, or various combinations of the above or other type of services. As discussed with reference to FIGS. 1A, 1B and 1C, the second communication device 108a or 108b includes one or more audible IVR menus. The communication device 102c includes the Visuphone 104a which displays data corresponding to the dialled phone number of the second communication device 108. Further, the Visuphone 104a may display a visual IVR menu corresponding to the audible IVR menu of the dialled phone number of the second communication device 108a or 108b. In an embodiment, the visual IVR menu may be displayed when a call is received from the second communication device 108b. Thereafter, the user 106 may select one or more options from the displayed visual IVR menu. In an embodiment, the visual IVR menu may have an associated identity (ID) or number. The visual IVR menu will indicate the version information of the visual IVR menu. In an embodiment, the Visuphone 104a may send selection information including one or more options selected by the user 106 to the second communication device 108b. In an embodiment, the Visuphone 104a may receive the audio/visual IVR menu from the second communication device 108b when a latest version of the visual IVR menu is not available at the communication device 102c. In an embodiment, the dialled second communication device 108b may request the information from the server of the communication network 100 when the information requested by the Visuphone 104a is not available at the second communication device 108b. Thereafter, the second communication device 108b may send the information received from the server to the Visuphone 104a. The Visuphone 104a may further request and/or receive information from the dialled second communication device 108b. Further, the Visuphone 104a may display the information at the communication device 102b. In an embodiment, the Visuphone 104a may include version information. The version information may be a combination of numbers, alphabets or an alphanumeric code indicating a version of the Visuphone 104a.

FIGS. 2A and 2B illustrate exemplary components of the communication device 102a for implementing the Visuphone 104a, in accordance with an embodiment of the invention. The communication device 102a includes a system bus 226 to connect the various components. Examples of system bus 226 include several types of bus structures including a memory bus, a peripheral bus, or a local bus using any of a variety of bus architectures. As discussed with reference to FIG. 1A, the communication device 102a can be a communication device such as computer, a smart-phone, and so forth. The communication device 102a can connect to PSTN 110 through a gateway 224, which is connected to network 114 through a network interface 212. Input/Output (IO) interface 214 of the communication device 102a may be configured to connect external or peripheral devices such as a memory card 216, a keyboard 218, a Universal Serial Bus (USB) device 220 and a mouse 222. Although not shown, various other devices can be connected through IO interface 214 to the communication device 102a. In an embodiment of the invention, the communication device 102a may be connected to a hub that provides various services such as voice communication, network access, television services and so forth. For example, the hub may be a Home Gateway device that acts as a hub between the home environment and the Broadband Network.

The communication device 102a includes a display 202 to output graphical information to the user 106. In an embodiment of the invention, the display 202 may include a touch sensitive screen. Therefore, the user 106 can provide inputs to the communication device 102a by touching display 202 or by point and click using the 'mouse'. A memory 206 of the communication device 102a stores various programs, data and/or instructions that can be executed by a processor 204. Examples of the memory 206 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 102a. The memory 206 may include Operating System (OS) (not shown) for the communication device 102a to function. Further, the memory 206 may include other applications that enable the user 106 to communicate/interact with the second communication device 108a (or 108b). Examples of other applications include, but are not limited to, Skype, Google Talk, Magic Jack, and so forth. Other applications may be stored as software or firmware on the communication device 102a.

Further, the memory 206 includes the Visuphone 104a for providing a visual representation of the second communication device 108. As discussed with reference to the FIG. 1A, the Visuphone 104a may be hardware, a software or a firmware stored on the communication device 102a. In an embodiment, the Visuphone 104a may be implemented as plug-in to other applications. The visual IVR menus are stored in a database 208 in the memory 206 of the communication device 102a. In an embodiment, the Visuphone 104a may receive updates about the visual IVR menus from the server of the communication network 100 at predefined time. The predefined time may be for example, once a week, once a month, or any other interval predefined by the user 106 or the Visuphone 104a. In an embodiment, the Visuphone 104a of the communication device may initiate a communication session with a plurality of second communication devices 108. In an embodiment, the Visuphone 104a may send one or more messages for establishing a communication session to a plurality of second communication devices 108.

In an embodiment, the Visuphone 104a may display a visual IVR menu associated with the dialled phone number of the second communication device 108 before actual communication session establishment. In an embodiment, the Visuphone 104a may display one or more communication options on the display 202 of the communication device 102a. The user 106 may input one or more key or key combinations using the keyboard 218. The keyboard 218 may be a physical keyboard or a virtual keyboard displayed on a touch screen display 202. In an embodiment, the keyboard 218 is a keypad on the communication device 102a. Subsequently, after some processing by the Visuphone 104*a*, the visual IVR menu corresponding to dialled phone number is searched and displayed on the display 202.

In an embodiment of the invention, the visual IVR menu may be provided in real-time to the user 106. In an embodiment of the invention, the visual IVR menu is provided by a messaging service such as a Short Messaging Service (SMS). Therefore, second communication device 108 may provide customized visual IVR menu to the user 106. The visual IVR menu may be customized based on the profile of the user 106. In an embodiment of the invention, the profile may be generated based on access pattern of user 106 or the data capture by a hub connected to the communication device 102*a*.

The user 106 can interact with the visual IVR menu by pressing a desired button from the keyboard 218. For example, the user 106 can press a '3' key from the keyboard 218 to select a node 3 in the visual IVR menu. Further, the user 106 can directly select the node 3 of the visual IVR menu from the display 202, in ease of a touch sensitive screen. Depending on the complexity or size of first party devices, visual IVR menu may have various nodes. Moreover, display area of the display 202 may be limited or small. As a result, all the nodes of the visual IVR menu may not be displayed together on the display 202. In such a case, the Visuphone 104*a* is configured to allow the user 106 to navigate by scrolling horizontally and/or vertically to view nodes on the visual IVR menu 202. Further, the Visuphone 104*a* may detect the capability of the communication device 102*a* before displaying the visual IVR menu. For example, in ease the communication device 102*a* is a basic mobile phone with limited functionality of the display screen. Therefore, the Visuphone 104*a* may display the visual IVR menu in form of a simple list. Similarly, a list may be displayed in case of fixed line or wired telephones. Moreover, in ease the communication device 102*a* includes a high capability screen, such as but not limited, to an iPhone, then the visual IVR menu is displayed in form of graphics. In one embodiment, the Visuphone 104*a* is configured to detect and present an application or computer program available on the communication device 102*a*.

In an embodiment, the user 106 may dial a phone number from a VOIP application 228 on the communication device 102*b*, as shown in FIG. 4B. The phone number may correspond to any of the plurality of second communication device 108 of the communication network 100. In an embodiment, the user 106 selects a pre-stored phone number from the VOIP application 228. In an embodiment, the Visuphone 104*a* may include a VOW plug-in that monitors the incoming/outgoing calls to/from the VOIP application. Therefore, the VOIP plug-in may search each phone number of the dialled second communication device 102 in the database 208. In ease, the calling phone number is found in the database 208 and is associated with an audible IVR, then the VOIP plug-in may display the visual IVR menu corresponding to the audible IVR menu of the dialled phone number of the second communication device 108*b*. In an embodiment, when the database does not include a match for the dialled phone number of the second communication device 108*b*, then the communication device 102*a* may request and/or receive a visual IVR menu associated with the phone number from the second communication device 102*b*.

FIG. 3 illustrates exemplary components of communication device 102*b* for implementing Visuphone 104*a*, in accordance with another embodiment of the invention. The communication device 102*b* includes a system bus 326 to connect the various components. Examples of system bus 326 include several types of bus structures such as, but not limited to, a memory bus or memory controller, a peripheral bus, or a local bus using any of a variety of bus architectures. As discussed with reference to FIG. 1B, the communication device 102*b* can be a computing device such as, but not limited to, a personal computer, a laptop, a mobile phone, a smart-phone, and so forth. The communication device 102*b* can connect to the network 114 through a network interface 310. Further, the communication device 102*b* can connect to PSTN 110 through gateway 324 and the network 112 through a network interface 310. An Input/Output (IO) interface 312 of the communication device 102*b* may be configured to connect external or peripheral devices such as a mouse 314, a keyboard 316, a speaker 318, a camera 320, and a microphone 322. Although not shown, various other devices such as a hard disk, a Universal Serial Bus (USB) device or others can be connected through the IO interface 312 to the communication device 102*b*. A person skilled the art will appreciate that although not described, various other types of devices capable of voice and/or data communication can be connected to the communication device 102*b*.

The communication device 102*b* includes a display interface 302 to connect to a display 308. The display interface 302 can be for example, a video adapter. The display 308 outputs graphical information to the user 106. In an embodiment of the invention, the display 308 includes a touch sensitive screen. Therefore, the user 106 can provide inputs to the communication device 102*b* by touching the display 308 or by pointing with the mouse and click. A memory 306 of the communication device 102*b* stores various programs, data and/or instructions that can be executed by Central Processing Unit (CPU) or processor 304. Examples of the memory 306 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by communication device 102*b*. The memory 306 may include Operating System (OS) not shown) for the communication device 102*b* to function. Further, the memory 306 may include other applications that enable the user 106 to communication with the second communication device 108*a* (or 108*b*). Examples of the other applications, but are not limited, to, Skype, Google Talk, Magic Jack, and so forth. Other applications may be stored as software or firmware on the communication device 102*b*. Further, the memory 306 includes the Visuphone 104*a* for searching and presenting a visual IVR menu corresponding to the audible IVR menu of a dialled phone number of the second communication device 108, as discussed with reference to FIGS. 2A and 2B. The Visuphone 104*a* may be an application stored as a software or firmware on the communication device 102*b*. The visual IVR menus are stored in visual menu database 208 in the memory 306 of the communication device 102*b*. The Visuphone 104*a* searches the visual menu database 208 for a visual. IVR menu corresponding to a phone number of the dialled phone number of the second communication device 108. Subsequently, the visual IVR menu is presented on the display 308 for selection of options by the user 106 or caller. Further, the Visuphone 104 may be implemented as plug-in to the other applications. Therefore, when a phone number is dialled from the other applications, the Visuphone 104*a* detects the dialling and automatically searches and displays the visual IVR menu corresponding to the dialled phone number. Thereafter, the user 106 can interact with the visual IVR menu, without listening to the audible IVR menu of the second communication device 108*b*. In an embodiment, the second communication device 108*b* may include a Visuphone 104*b* as shown in FIG. 1B. The Visuphone 104b can function similar to the Visuphone 104a as explained above.

FIG. 4A illustrates au exemplary packet 402 sent from the communication device 102 to the second communication device 108b, in accordance with an embodiment of the present invention, in an embodiment, the Visuphone 104a of the communication device 102a may send the packet 402 to the second communication device 108b for establishing a communication session when a data network such as the Internet is available. Examples of the packet 402 include but are not limited to an Internet. Protocol version 4 (IPv4) packet, an Internet Protocol version 6 (IPv6) packet, and so forth. In an embodiment, the packet 402 includes a first section 402a and a second section 402b. The first section 402a of the packet includes first information. In an embodiment, the first section 402a may include header information. Examples of the first information include, bin are not limited to Visuphone version, a visual menu identity (ID) of the visual IVR menu associated with the second communication device 108, an ACK bit, and so forth. The Visuphone version indicates the version information of the Visuphone 104a present at the communication device 102a. The visual menu ID indicates the identity information of the visual IVR menu associated with the dialled phone number of the second communication device 108. In an embodiment, the ACK or acknowledgement hit may be used by the second communication device to send an acknowledgement message. In an embodiment, the ACK bit may have a value such as 0 or 1. For example, the second communication device 108 may set the ACK bit or acknowledgement bit to 1 and send it back to the communication device 102a as an acknowledgement message. A value 1 in the ACK bit indicates that the message is an acknowledgement message for a previously sent message or section of the packet. In an embodiment, the second communication device 108 sends the acknowledgement message when the second communication device 108 includes the Visuphone 104b. The ACK bit set as indicates that the packet sent from the first section has been received at the second communication device 108. In an embodiment of the invention, the first section 402a may be a header section of IPv6 packet. The structure of header section or first section 402a is shown in FIG. 4B.

In an embodiment, the second section 402b of the packet 402 may include, second information. Examples of the second information include, but are not limited to, a user ID, user options (selected from the visual IVR menu), user profile information (last dialled, details), and so forth. In an embodiment, the second section may include a data or payload section. The user ID is the identity information of the user 106 dialling the phone number of the second communication device 108. The user options indicate selection information including the one or more options selected from the displayed visual. IVR menu. The Visuphone 104a displays the visual IVR menu associated with the second communication device 108 when the user dials the phone number of the second communication device 108. The user profile indicates the information related to previous communication session or activities of the user 106 or communication device 102a. The user profile indicates information such as last dialled numbers, time of last call, duration of last call to the second communication device 108, access pattern of the user 106, and so forth. In an embodiment, the second section 402b may be a payload or data section of IPv6 packet. In an embodiment, the information of the first section 402a and the second section 402b may be sent separately as two different packets by the Visuphone 104a. In an embodiment the first section 402a and second section 402b may be sent in form of DIME tones or signals. The messages are sent in form of DTMF tones when the data network is not available.

FIG. 4B illustrates an exemplary structure of the first section 402a of the packet 402, in accordance with an embodiment of the invention. In an embodiment, the first section 402a of the packet 402 may be a header section of IPv6 packet. The first section 402a may include a plurality of fields. Example of plurality of fields include, but are not limited to, a packet version, a traffic class, a flow label, a payload length, a next header, a hop limit, a source address, a destination address, and so forth. The packet version indicates version information associated with the packet 402 such as IPv4, IPv6, and so forth. The version information may include numeric characters, alphabets or a combination thereof. In an embodiment of the invention, the traffic class may indicate whether the source device i.e. communication device 102a of the packet 402 provides congestion control management or not. The flow label may be used to provide real time applications special services. The next header field points to next element or packet in the chain of packets when multiple packets are sent. The payload, length may indicate the size or length of the payload or data section (the second section 402b). The hop limit may indicate the number of stops or hops the packet 402 may take before reaching the final destination or the second communication device 108. The source address may include the address of the communication device 102a. The destination address may be address of the second communication device 108. In an embodiment, the destination address may be the address of next hop of the packet 402.

FIGS. 5A and 5B illustrates a flowchart diagram for communicating among a plurality of communication devices, in accordance with an embodiment of the invention. As discussed with reference to the FIGS. 1A and 1B, the communication network 100 includes the communication device 102a. Further, the communication network 100 includes the second communication device 108. In an embodiment, the communication device 102a may include the Visuphone 104a. In an embodiment, the second communication device 10813 may include a Visuphone 104b as shown in FIG. 1B. In another embodiment, the second communication device 108 may not include a Visuphone as shown in FIG. 1A. The Visuphone 104a of the communication device 102a may send one or more messages or packets to the second communication device 108. The messages may be sent as Dual-Tone Multi-Frequency signals or tones depending on the availability of the data network. Similarly, the Visuphone 104b may receive or send one or more messages/packets from/to the communication device 102. Further, the Visuphone 104 may display the visual IVR menu associated with a phone number of the second communication device 108. The communication device 102a includes one or more visual IVR menus associated with a plurality of second communication devices.

The user 106 may dial a phone number of the second communication device 108. In an embodiment, the Visuphone 104a may display a visual IVR menu associated with the dialled second communication device 108. At step 502, the Visuphone 104a of the communication device searches for a data network such as the Internet. At step 504, an availability of the data network is checked. When the data network is available the process continues to step 508 else the process control goes to step 506. At step 506, the Visuphone 104a sends a first section of the packet to the second communication device 108 such as the second communication device 108b as DTMF signals or tones. The first section may include a first information or header information. Thereafter, the communication device 102*a* and the second communication device 108 may further communicate through the exchange of DTMF tones or signals.

At step 508, the Visuphone 104*a* sends a first section of the packet as a data packet to the second communication device 108*a* when the data network is available. In an embodiment, the data packet may be an IPv4 packet, an IPv6 packet, and so forth. The first section 104*a* includes first information. Examples of the first information include, but are not limited to, Visuphone version, a visual menu identity (ID) associated with the visual IVR menu corresponding to the second communication device 108, an ACK bit, hop limit, payload length, traffic class, and so forth. The Visuphone version indicates the version information of the Visuphone 104*a* present at the communication device 102*a*. In an embodiment, the visual menu ID may indicate the identity information of the visual IVR menu associated with the dialled phone number of the second communication device 108. The ACK bit or acknowledgement bit may be used by the second communication device to send an acknowledgement message from which the first section is received. In an embodiment, the ACK hit may have a value such as 0 or 1. At step 510, it is checked, at the second communication device 108, whether a Visuphone is available at the second communication device 108. If the Visuphone is not available, the communication device 102 and the second communication device 108 may communicate by exchanging messages/information as DTMF tones or signals else process control goes to step 512. At step 512, an acknowledgement message based on the first section is received from the second communication device 108. In an embodiment, the acknowledgement message is received based on the first information of the first section. In an embodiment, the Visuphone 104*b* of the second communication device 108*b* sends the acknowledgement message to the communication device 102*a*.

At step 514, the Visuphone 104*a* sends a second section of the packet including second information to the second communication device 108*b*. Examples of the second information include, but are not limited to, a user ID, user options (selected from the visual IVR menu), user profile information (last dialled details), and so forth. The user ID is the identity information of the user 106 who dials the phone number of the second communication device 108. The user options indicate selection information including the one or more options selected from the displayed visual IVR menu. The visual IVR menu is associated with the phone number of the second communication device 108 dialled from the communication device 102*a*. The Visuphone 104*a* may display the visual IVR menu associated with the second communication device 108. The user profile indicates the information related to previous communication session or activities of the user 106 or the communication device 102*a*. The user profile indicates information such as last dialled numbers, time of last call, duration of last call to the second communication device 108, and so forth.

In an embodiment, the Visuphone 104*a* may send header information as a first section of the packet and data or payload as second section of the packet. In an embodiment, the communication device may send the second section of the packet after receiving an acknowledgement message from the second communication device. In an embodiment, the first section and the second section of the packet may be sent as a single packet 402, as shown in FIG. 4.

Embodiments of the invention provide a method for establishing a communication session among a plurality of communication devices. A communication device may send a first section including first information or header information to a second communication device. A Visuphone at the communication device sends the first section. The communication device includes one or more visual IVR menus. The header information may include information such as Visuphone version, visual IVR menu ID, ACK bit, and so forth. In an embodiment, the communication device may receive an acknowledgement message based on the first section from the second communication device. The acknowledgement message is received when the second communication device includes a Visuphone. Thereafter, the Visuphone at the second communication device may send a second section or packet including a second information or payload to the second communication device. The payload may include information such as user ID, user profile, user selection, and so forth. Thereafter, a communication session is established between the communication device and the second communication device. In an embodiment, the second communication device may not include the Visuphone. In such a ease the communication device and the second communication device communicates through DTMF signals or tones.

An advantage of the invention is that the communication device can send more information as data packets/messages to the second communication device by using a data network. The data packets may be exchanged among various communication devices. The data packet may include information required for establishing a communication session.

Another aspect of the invention is to provide a system for communicating among a plurality of IVR enabled communication devices.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A user communication device for communicating in a network, wherein said user communication device, comprising:
   a processor; and
   a memory coupled to the processor, the memory comprising:
      a database comprising at least one visual Interactive Voice Response (IVR) menu associated with at least one IVR system;
      instructions executable by the processor for sending a first section of a data packet to a second communication device, wherein the first section comprising first information is sent based on a visual IVR menu associated with the second communication device;
      instructions executable by the processor for receiving an acknowledgement message from the second communication device based on the first section of the data packet; and
      instructions executable by the processor for sending a second section of the data packet to the second communication device based on the acknowledgement message, wherein the second section comprises second information.

2. The user communication device of claim 1, wherein the first information comprises at least one of:
   a visual menu identity (ID) associated with a visual IVR menu of the second communication device, the visual IVR menu comprises one or more options; and
   version information of an IVR application associated with the user communication device.

3. The user communication device of claim 1, wherein said user communication device is a user mobile terminal with communication channel to said second communication and to a user device.

4. The user communication device of claim 1, wherein the memory further comprises:
   instructions executable by the processor for transferring to be displayed the visual IVR menu associated with said second communication device.

5. The user communication device of claim 1, wherein the acknowledgement message is received when the second communication device comprises the IVR application.

6. A method for communicating among a first user communication device and a second user communication device comprising:
   sending, by said first user communication device, a first section of a data packet to said second user communication device comprises an IVR system, wherein the first section comprising first information is sent based on a visual Interactive Voice Response (IVR) menu associated with the second user communication device;
   detecting, at said first user communication device, an acknowledgement message from the second user communication device based on the first section of the data packet; and
   sending, by said first user communication device, a second section of the data packet to the second user communication device based on the acknowledgement message, wherein the second section comprises second information.

7. The method of claim 6, wherein the first information comprises at least one of:
   a visual menu identity (ID) associated with a visual IVR menu of the second user communication device, the visual IVR menu comprises one or more options; and
   version information of an IVR application associated with the first user communication device.

8. The method of claim 6, wherein said first user communication device is a user mobile terminal with communication channel to said second user communication device and to a user device.

9. The method of claim 6 further comprising:
   transferring to be displayed, at the first user communication device, a visual IVR menu associated with the second user communication device.

10. The method of claim 6, wherein the acknowledgement message is received when the second user communication device comprises an IVR application.

11. A computer readable media comprising instructions to implement the method of claim 6.

12. The method of claim 6 further comprising sending, by the first user communication device, one or messages as Dual-Tone Multi-Frequency (DTMF) signals to the second user communication device.

13. A method for establishing a communication session in a communication network between a first user communication device and a second user communication device, wherein said second user communication device comprises an Interactive Voice Response (IVR) system;
   detecting, by said first user communication device, a data network;
   sending, by said first user communication device, a first section of a data packet to the second user communication device when the data network is detected, wherein the first section comprises first information;
   detecting, at said first user communication device, an acknowledgement message from the second user communication device based on the first section of the data packet; and
   sending, by said first user communication device, a second section of the data packet to the second user communication device based on the acknowledgement message, wherein the second section comprises second information.

14. The method of claim 13 further comprising receiving, at the first user communication device, an acknowledgement message from the second user communication device based on the first section of the data packet, wherein the acknowledgement message is received when the second user communication device comprises an IVR application.

15. The method of claim 13 wherein said first user communication device is a user mobile terminal.

16. The method of claim 13, wherein the first information comprises at least one of:
   a visual menu identity (ID) associated with a visual IVR menu of the second user communication device, the visual IVR menu comprises one or more options; and version information of an IVR application associated with the first user communication device.

17. The method of claim 16, wherein said communication session is part of construction at least one visual menu record.

18. The method of claim 13 further comprising:
transferring to be displayed, at a user device, a visual IVR menu corresponding to the second user communication device, the visual IVR menu comprises one or more options.

19. The method of claim 13, wherein the first section is sent as Dual-Tone Multi-Frequency (DTMF) signals when the data network is not detected.

20. The method of claim 13, wherein the first user communication device comprises an IVR application.

* * * * *